United States Patent
Chen (10) Patent No.: US 11,972,063 B2
(45) Date of Patent: Apr. 30, 2024

(54) KEYBOARD DEVICE WITH KEY GUIDE MEMBER SIDE PLATES ARRANGED CLOSE TO GROOVE WALLS

(71) Applicant: Chicony Electronics Co., Ltd., New Taipei (TW)

(72) Inventor: Tao-Kuan Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 18/184,349

(22) Filed: Mar. 15, 2023

(65) Prior Publication Data

US 2023/0341949 A1 Oct. 26, 2023

(30) Foreign Application Priority Data

Apr. 22, 2022 (TW) .................................. 111115524

(51) Int. Cl.
*G06F 3/02* (2006.01)
(52) U.S. Cl.
CPC .................. *G06F 3/0202* (2013.01)
(58) Field of Classification Search
CPC .............. G06F 3/0202; H01H 13/14
See application file for complete search history.

(56) References Cited

U.S. PATENT DOCUMENTS

| | | |
|---|---|---|
| 8,235,611 B2 | 8/2012 | Chang |
| 2008/0006516 A1* | 1/2008 | Nishino ................. H01H 3/122 200/345 |
| 2015/0136572 A1* | 5/2015 | Liu ........................ H01H 13/52 200/248 |
| 2017/0125186 A1* | 5/2017 | Lin ..................... H01H 13/7065 |
| 2018/0090287 A1* | 3/2018 | Koshimura .......... H01H 13/705 |
| 2020/0402739 A1* | 12/2020 | Fujino .................... H01H 13/83 |

FOREIGN PATENT DOCUMENTS

TW 202001958 A 1/2020

* cited by examiner

*Primary Examiner* — Liliana Cerullo
(74) *Attorney, Agent, or Firm* — MUNCY, GEISSLER, OLDS & LOWE, P.C.

(57) ABSTRACT

A keyboard device includes a frame and keys. The frame includes key guide grooves each including a first groove wall and a second groove wall. The keys are slidably assembled in the key guide grooves. The key includes a keycap and a guide member. A brim of the keycap includes a first side edge and a second side edge. The guide member includes a first side plate and a second side plate. The first side plate is in the key guide groove, integrally extends from the first side edge, and is arranged close to the first groove wall. The second side plate is in the key guide groove, integrally extends from the second side edge, and is arranged close to the second groove wall.

11 Claims, 8 Drawing Sheets

KEYBOARD DEVICE WITH KEY GUIDE MEMBER SIDE PLATES ARRANGED CLOSE TO GROOVE WALLS

CROSS-REFERENCE TO RELATED APPLICATION

This non-provisional application claims priority under 35 U.S.C. § 119(a) to Patent Application No. 111115524 filed in Taiwan, R.O.C. on Apr. 22, 2022, the entire contents of which are hereby incorporated by reference.

BACKGROUND

Technical Field

The instant disclosure relates to an input device, in particular, to a keyboard device.

Related Art

Keyboards are common input devices. Usually, they are used along with daily computer products (such as laptops, notebook computers, smart phones, or tablets), industrial scaled control equipment, or processing equipment for operation or text inputs.

SUMMARY

For the keyboards on the market, many types of the keys are available. As to a key-post type key known to the inventor, in general, the key includes a keycap and a frame, the frame has a slide groove, and the keycap is slidably disposed in the slide groove. Moreover, a post member is at center portion of the bottom of the keycap to abut against an elastic member, so that the keycap is moved resiliently through the elastic force of the elastic member.

However, during the process of operating the key by a user, the user does not always press the center portion of the top of the keycap accurately. When the user presses the edge or the corner of the keycap, because of the force arm between the post member and the edge or the corner of the keycap is excessive, the keycap may be deflected easily and cannot be moved smoothly. Moreover, such condition would cause the keycap to fail to be moved downward properly. As a result, the user cannot operate the key properly, thus affecting the operation feelings of the keyboard. Furthermore, when the keycap cannot be moved smoothly, noises will also be generated during the movement of the keycap.

In view of this, in one embodiment, a keyboard device is provided. The keyboard device comprises a frame and a plurality of keys. The frame comprises a plurality of key guide grooves spacedly arranged from each other. Each of the key guide grooves comprises a first groove wall and a second groove wall opposite to the first groove wall. The keys are slidably assembled in the key guide grooves. Each of the keys comprises a keycap and a guide member. The keycap comprises a cap and a brim. The cap has a bottom surface, and the brim is connected to a peripheral portion of the bottom surface and extends toward a bottom portion of the frame. The brim has annular bottom portion, and the annular bottom portion comprises a first side edge and a second side edge opposite to the first side edge. The guide member comprises a first side plate and a second side plate opposite to the first side plate. The first side plate integrally extends from the first side edge. The second side plate extends from the second side edge. The first side plate of each of the keys is in a corresponding one of the key guide grooves and close to the first groove wall of the corresponding one of the key guide grooves. The second side plate of each of the keys is in the corresponding one of the key guide grooves and close to the second groove wall of the corresponding one of the key guide grooves.

Based on the above, in the keyboard device according to one or some embodiments of the instant disclosure, the first side plate of the guide member integrally extends from the first side edge of the brim and the second side plate of the guide member integrally extends from the second side edge of the brim. Therefore, the first side plate and the second side plate can be arranged close to the first groove wall and the second groove wall of the key guide groove as much as possible. Therefore, during the operation of the keycap, when the edge or the corner of the keycap is pressed, the length of the force arm can be greatly reduced, thus preventing the key from being deflected. Hence, the keycap can be moved smoothly. Consequently, the operation feeling of the keyboard device can be improved, and the noises generated during the operation of the keyboard device can be also reduced.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
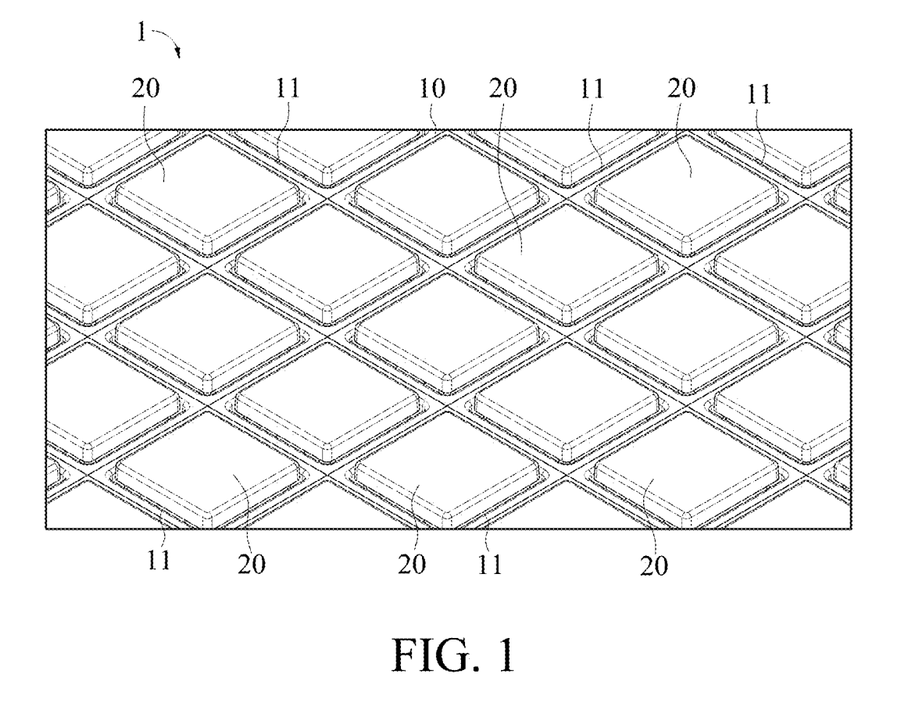
FIG. 1 illustrates a perspective view of a keyboard device according to an exemplary embodiment of the instant disclosure.

FIG. 1 illustrates a perspective view of a keyboard device according to an exemplary embodiment of the instant disclosure. As shown in FIG. 1, the keyboard device 1 comprises a frame 10 and a plurality of keys 20. The keyboard device 1 may be utilized as the input device of various electronic devices (e.g., laptop computers, notebook computers, or input devices of other electronic devices), and users can operate the keyboard device 1 to generate corresponding signal(s).

As shown in FIG. 1, the frame 10 comprises a plurality of key guide grooves 11, and the frame 10 may be integrally formed as a one-piece member. For example, the frame 10 may be integrally formed by injection molding, casting, or the like. The key guide grooves 11 are spacedly arranged from each other, and each of the key guide grooves 11 is defined through the frame 10 from the top surface to the bottom surface along a vertical direction. In this embodiment, the key guide groove 11 is a rectangular groove to correspond to the shape of the key 20. The keys 20 are slidably assembled in the key guide grooves 11. Specifically, in some embodiments, each of the keys 20 is capable of being moved upward and downward vertically along a corresponding one of the key guide grooves 11.

Figure 2:
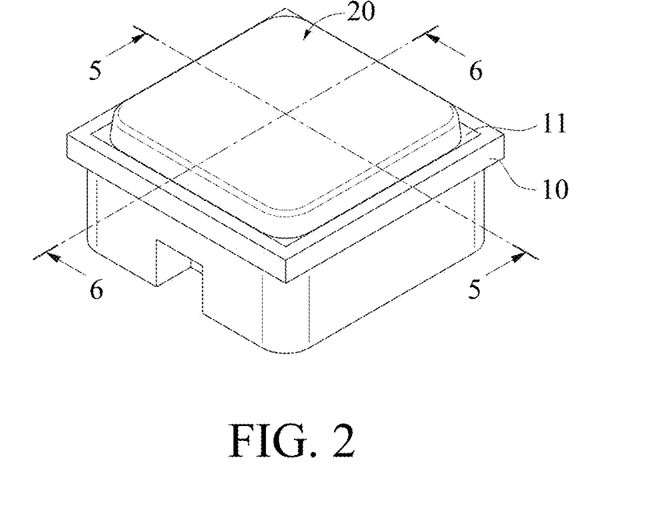
FIG. 2 illustrates a partial perspective view of a keyboard device according to a first embodiment of the instant disclosure.
Figure 3:
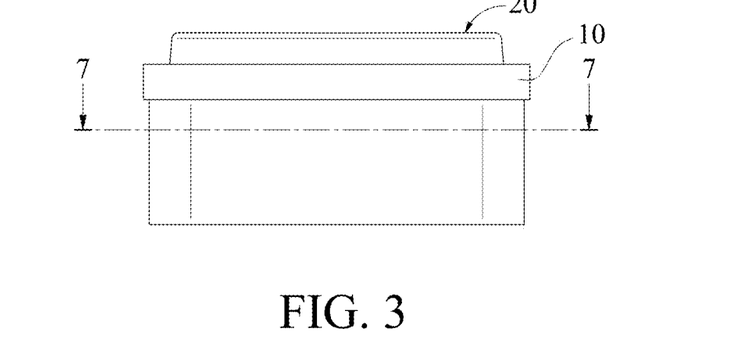
FIG. 3 illustrates a partial side view of the keyboard device of the first embodiment.
Figure 4:
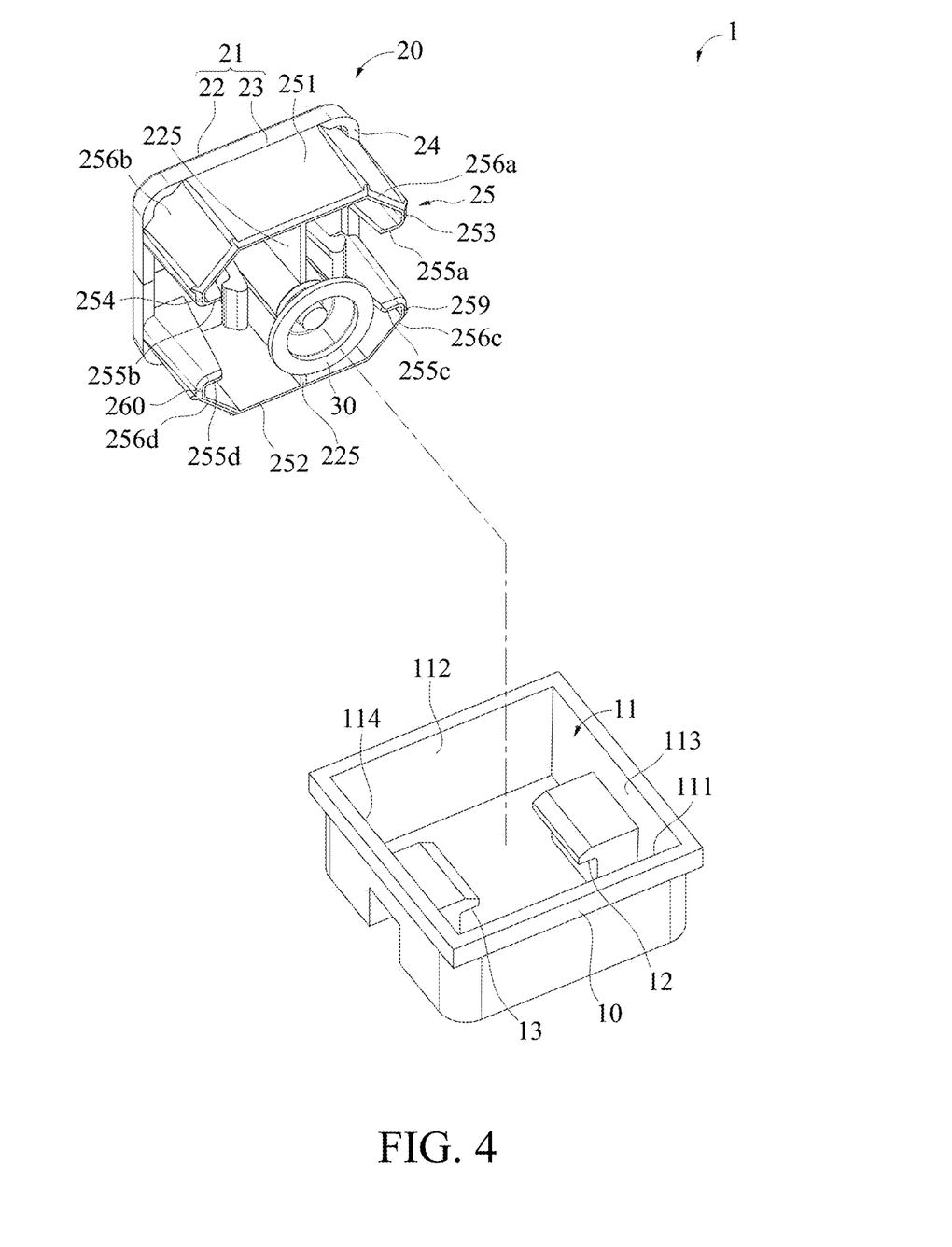
FIG. 4 illustrates a partial exploded view of the keyboard device of the first embodiment.
Figure 5:
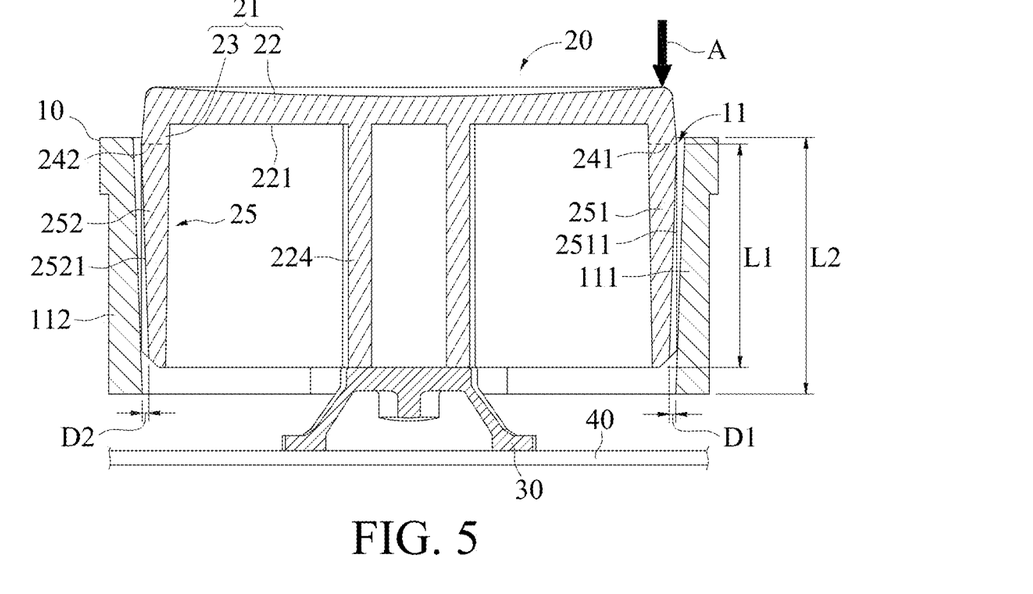
FIG. 5 illustrates a cross-sectional view along line 5-5 shown in FIG. 2.
Figure 6:
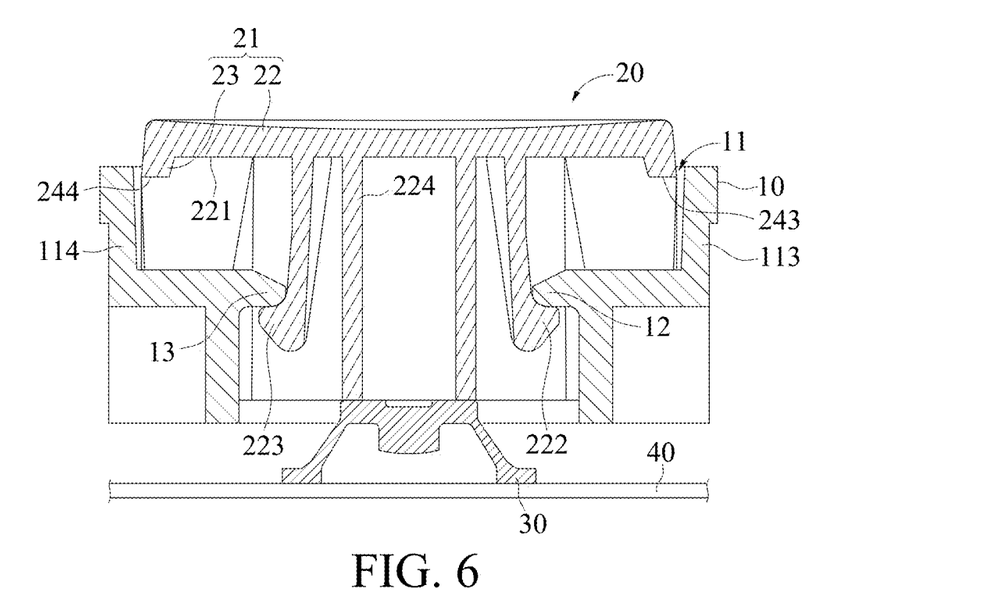
FIG. 6 illustrates a cross-sectional view along line 6-6 shown in FIG. 2.
Figure 7:
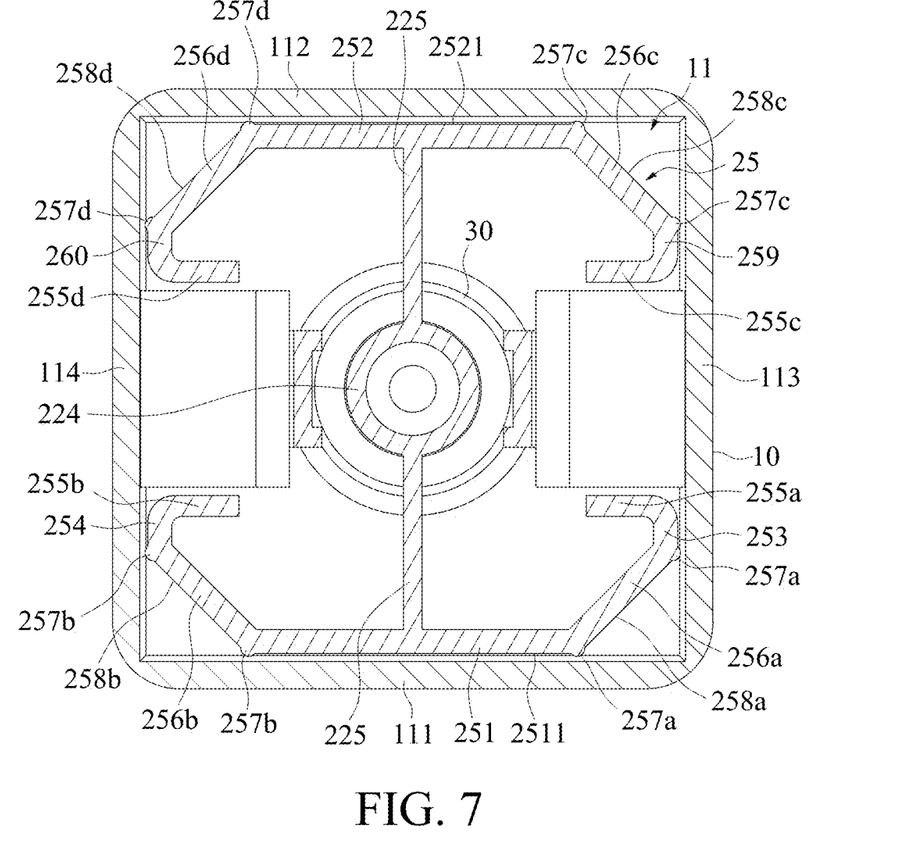
FIG. 7 illustrates a cross-sectional view along line 7-7 shown in FIG. 3.

FIG. 2 illustrates a partial perspective view of a keyboard device 1 according to a first embodiment of the instant disclosure. FIG. 3 illustrates a partial side view of the keyboard device 1 of the first embodiment. FIG. 4 illustrates a partial exploded view of the keyboard device 1 of the first embodiment. FIG. 5 illustrates a cross-sectional view along line 5-5 shown in FIG. 2. FIG. 6 illustrates a cross-sectional view along line 6-6 shown in FIG. 2. FIG. 7 illustrates a cross-sectional view along line 7-7 shown in FIG. 3. As shown in FIG. 2 to FIG. 4, take one of the key guide grooves 11 and a corresponding one of the keys 20 as an example, the key guide groove 11 is a rectangular groove and comprises four groove walls. The four groove walls comprise a first groove wall 111 and a second groove wall 112 opposite to the first groove wall 111 as well as a third groove wall 113 and a fourth groove wall 114 opposite to the third groove wall 113.

As shown in FIG. 4 to FIG. 7, each of the keys 20 comprises a keycap 21 and a guide member 25. The keycap 21 comprises a cap 22 and a brim 23. The cap 22 is a plate and has a bottom surface 221, the cap 22 is above the key guide groove 11, and the bottom surface 221 of the cap 22 faces a bottom portion of the frame 10. The brim 23 is an annular block and is connected to a peripheral portion of the bottom surface 221, the brim 23 extends toward the bottom portion of the frame 10, and the brim 23 has an annular bottom portion 24. In this embodiment, the annular bottom portion 24 extends into the key guide groove 11, the annular bottom portion 24 is a rectangular bottom and comprises four side edges. The four side edges comprise a first side edge 241 and a second side edge 242 opposite to the first side edge 241 as well as a third side edge 243 and a fourth side edge 244 opposite to the third side edge 243. Moreover, the first side edge 241, the second side edge 242, the third side edge 243, and the fourth side edge 244 of the annular bottom portion 24 are respectively adjacent to the first groove wall 111, the second groove wall 112, the third groove wall 113, and the fourth groove wall 114 of the key guide groove 11.

As shown in FIG. 4 and FIG. 5, the guide member 25 of the key 20 guides the cap 22 to be moved upward and downward vertically along the key guide groove. The guide member 25 comprises a first side plate 251 and a second side plate 252 opposite to the first side plate 251. In this embodiment, both the first side plate 251 and the second side plate 252 are standing side plates. The first side plate 251 is in the key guide groove 11 and integrally extends from the first side edge 241 of the brim 23. In other words, in this embodiment, the first side plate 251 extends from the first side edge 241 of the brim 23 (along the vertical direction), rather than the bottom surface 221 of the cap 22. Hence, the first side plate 251 is arranged close to the edge of the key 20 as much as possible, and the first side plate 251 is arranged close to the first groove wall 111 of the key guide groove 11. For example, the distance D1 between the first side plate 251 and the first groove wall 111 (as shown in FIG. 5) may be in a range between 0.03 mm and 0.05 mm, so that the first side plate 251 and the first groove wall 111 are close to each other. Likewise, the second side plate 252 is also in the key guide groove 11 and integrally extends from the second side edge 242 of the brim 23. In other words, in this embodiment, the second side plate 252 extends from the second side edge 242 of the brim 23 (along the vertical direction), rather than the bottom surface 221 of the cap 22. Hence, the second side plate 252 is arranged close to the edge of the key 20 as much as possible, and the second side plate 252 is arranged close to the second groove wall 112 of the key guide groove 11. For example, the distance D2 between the second side plate 252 and the second groove wall 112 (as shown in FIG. 5) may be in a range between 0.03 mm and 0.05 mm, so that the second side plate 252 and the second groove wall 112 are close to each other.

Furthermore, as shown in FIG. 5, in this embodiment, a thickness of a portion of the first side plate 251 connecting to the top portion of the first side edge 241 is equal to a thickness of the first side edge 241, so that the edge of the top portion of the first side plate 251 is flushed with the edge of the first side edge 241. Likewise, a thickness of a portion of the second side plate 252 connecting to the top portion of the second side edge 242 is equal to a thickness of the second side edge 242, so that the edge of the top portion of the second side plate 252 is flushed with the edge of the second side edge 242. It is understood that, the foregoing embodiments are provided for illustrative purposes, but not limitations of the instant disclosure. In some embodiments, the thickness of the first side plate 251 may be less than the thickness of the first side edge 241, and the thickness of the second side plate 252 may be less than the thickness of the second side edge 242 as well.

Accordingly, as shown in FIG. 4 and FIG. 5, according to one or some embodiments of the instant disclosure, the first side plate 251 of the guide member 25 integrally extends from the first side edge 241 of the brim 23 and the second side plate 252 of the guide member 25 integrally extends from the second side edge 242 of the brim 23. Therefore, the first side plate 251 and the second side plate 252 can be arranged close to the first groove wall 111 and the second groove wall 112 of the key guide groove 11 as much as possible. Therefore, during the operation of the keycap 21, when the edge or the corner of the keycap 21 adjacent to the first side plate 251 or the second side plate 252 is pressed (as indicated by the arrow A shown in FIG. 5, the edge or the corner of the keycap 21 adjacent to the first side plate 251 is pressed), the pressing force can be transmitted downward to the first side plate 251 or the second side plate 252 directly, so that the length of the force arm can be greatly reduced (almost close to zero). Therefore, the key 20 can be moved downward along the key guide groove 11 properly, thus preventing the key 20 from being deflected and wearing against other components. Therefore, the key 20 can be moved smoothly. Consequently, the operation feeling of the keyboard device 1 can be improved, and the noises generated during the operation of the keyboard device 1 can be also reduced.

As shown in FIG. 4 to FIG. 6, the keyboard device 1 further comprises a plurality of elastic members 30. A trigger member 224 is on the bottom surface 221 of the cap of each of the keys 20, and each of the elastic members 30 abuts against the trigger member 224 of a corresponding one of the keys 20. In this embodiment, the trigger member 224 is a cylindrical member and vertically extends from a center portion of the bottom surface 221 of the cap 22, and the trigger member 224 is inside the key guide groove 11. The elastic member 30 may be a rubber dome, a metal dome, a metal piece, a spring, a mechanical switch, or the like. The top portion of the elastic member 30 abuts against the trigger member 224, and the bottom portion of the elastic member 30 is on a circuit board 40. The circuit board 40 may be a printed circuit board (PCB), a membrane circuit board, a flexible printed circuit board (FPCB), a rigid-flex PCB, etc.

As shown in FIG. 4 and FIG. 7, in this embodiment, two connection plates 225 further extend from two opposite sides of the trigger member 224. The two connection plates 225 are integrally connected to the first side plate 251 and the second side plate 252, respectively, so that the overall structural strength of the guide member 25 can be enhanced.

As shown in FIG. 4 and FIG. 6, a first limiting member 12 and a second limiting member 13 are in the key guide groove 11. In this embodiment, the first limiting member 12 is a protruding block extending from the third groove wall 113, and the second limiting member 13 is a protruding block extending from the fourth groove wall 114. A first barb 222 and a second barb 223 are on the bottom surface 221 of the cap 22, the first barb 222 and the second barb 223 are respectively at two opposite sides of the trigger member 224, and the first barb 222 and the second barb 223 are respectively hooked with the first limiting member 12 and the second limiting member 13. Therefore, when the key 20 is pressed to be moved downward along the key guide groove 11, the first barb 222 and the second barb 223 are respectively detached from the first limiting member 12 and the second limiting member 23, while the elastic member 30 is abutted against the trigger member 224 to trigger the circuit board 40 to generate corresponding signal(s). When the key 20 is released, the key 20 is moved upward through the elastic force stored in the elastic member 30, so that the first barb 222 and the second barb 223 are hooked with the first limiting member 12 and the second limiting member 13. Therefore, the key 20 can be limited and can be prevented from being detached off the key guide groove 11.

As shown in FIG. 4 and FIG. 7, the guide member 25 of the key 20 comprises at least one slant connection plate 256a. In this embodiment, the guide member 25 comprises four slant connection plates 256a, 256b, 256c, 256d. The slant connection plate 256a and the slant connection plate 256b are integrally connected to two opposite sides of the first side plate 251, respectively. Two bar-shaped ribs 257a are on the slant connection plate 256a along a vertical direction, and the two bar-shaped ribs 257a are respectively in contact with the first groove wall 111 and the third groove wall 113 of the key guide groove 11. Two bar-shaped ribs 257b are on the slant connection plate 256b along the vertical direction, and the two bar-shaped ribs 257b are respectively in contact with the first groove wall 111 and the fourth groove wall 114 of the key guide groove 11. The slant connection plate 256a and the slant connection plate 256b are integrally connected to two opposite sides of the first side plate 251, respectively. Two bar-shaped ribs 257a are on the slant connection plate 256a along a vertical direction, and the two bar-shaped ribs 257a are respectively in contact with the first groove wall 111 and the third groove wall 113 of the key guide groove 11. Likewise, two bar-shaped ribs 257b are on the slant connection plate 256b along the vertical direction, and the two bar-shaped ribs 257b are respectively in contact with the first groove wall 111 and the fourth groove wall 114 of the key guide groove 11. The slant connection plate 256c and the slant connection plate 256d are integrally connected to two opposite sides of the second side plate 252, respectively. Two bar-shaped ribs 257c are on the slant connection plate 256c along the vertical direction, and the two bar-shaped ribs 257c are respectively in contact with the second groove wall 112 and the third groove wall 113 of the key guide groove 11. Likewise, two bar-shaped ribs 257d are on the slant connection plate 256d along the vertical direction, and the two bar-shaped ribs 257d are respectively in contact with the second groove wall 112 and the fourth groove wall 114 of the key guide groove 11.

Therefore, as shown in FIG. 7, according one or some embodiments of the instant disclosure, the bar-shaped ribs 257a, 257b, 257c, 257d are in contact with the groove walls of the key guide groove 11, while the first side plate 251 and the second side plate 252 are not in contact with the groove walls of the key guide groove 11. Therefore, the friction and contact area between the guide member 25 and the key guide groove 11 can be greatly reduced, thereby reducing the resistance for pressing the key 20 downward. Moreover, in this embodiment, the four slant connection plates 256a, 256b, 256c, 256d are respectively adjacent to the four corners of the key guide groove 11, so that the stability of the upward and downward movement of the key 20 can be further enhanced.

Further, as shown in FIG. 7, an oil supplying groove 258a is formed between the two bar-shaped ribs 257a of the slant connection plate 256a, an oil supplying groove 258b is formed between the two bar-shaped ribs 257b of the slant connection plate 256b, an oil supplying groove 258c is formed between the two bar-shaped ribs 257c of the slant connection plate 256c, and an oil supplying groove 258d is formed between the two bar-shaped ribs 257d of the slant connection plate 256d, respectively. The oil supplying grooves 258a, 258b, 258c, 258d can be provided for storing lubricating oil. Therefore, during the upward and downward movement of the key 20, the lubricating oil can be provided for the bar-shaped ribs 257a, 257b, 257c, 257d for lubrication, thereby further reducing the frictional resistance between the bar-shaped ribs 257a, 257b, 257c, 257d and the groove walls of the key guide groove 11. Moreover, the four slant connection plates 256a, 256b, 256c, 256d are respectively adjacent to the four corners of the key guide groove 11, so that the lubricating oil can be injected into the oil supplying grooves 258a, 258b, 258c, 258d from the corners of the key guide groove 11 conveniently.

Further, as shown in FIG. 5, the first side plate 251 of the guide member 25 of the key 20 has a first side surface 2511 facing the first groove wall 111, the second side plate 252 of the guide member 25 also has a second side surface 2521 facing the second groove wall 112, and both the first side surface and the second side surface are inclined surfaces. Therefore, during the upward and downward movement of the key 20, the first side plate 251 and the second side plate 252 can be prevented from contacting the groove walls of the key guide groove 11. Moreover, according to some embodiments, both the first side surface 2511 and the second side surface 2512 are inclined surfaces, so that the key 20 can be detached from the mold conveniently during the manufacturing process.

As shown in FIG. 4 and FIG. 5, in this embodiment, after the key 20 is assembled on the frame 10, the first side plate 251 of the guide member 25 has a first vertical length L1 and is received in the frame 10, the first groove wall 111 has a second vertical length L2, and the first vertical length L1 is greater than half of the second vertical length L2. For example, when the second vertical length L2 of the first groove wall 111 is 1 cm, the first vertical length L1 of the first side plate 251 is greater than 0.5 cm. therefore, the overlap area between the first side plate 251 and the first groove wall 111 can be effectively increased, thereby preventing the key 20 from being deflected during the upward and downward movement of the key 20. In some embodiments, the vertical length of the second side plate 252 of the guide member 25 may be greater than half of the vertical length of the second groove wall 112.

Furthermore, as shown in FIG. 4 to FIG. 7, in this embodiment, the guide member 25 comprises a third side plate 253 and a fourth side plate 254 opposite to the third side plate 253. In this embodiment, both the third side plate 253 and the fourth side plate 254 are standing side plates. The third side plate 253 is in the key guide groove 11 and integrally extends from the third side edge 243. In other words, in this embodiment, the third side plate 253 extends from the third side edge 243 of the brim 23 (along the vertical direction), rather than the bottom surface 221 of the cap 22. Hence, the third side plate 253 is arranged close to the edge of the key 20 as much as possible, and the third side plate 253 is arranged close to the third groove wall 113 of the key guide groove 11. For example, the distance between the third side plate 253 and the third groove wall 113 may be in a range between 0.03 mm and 0.05 mm, so that the third side plate 253 and the third groove wall 113 are close to each other. Likewise, the fourth side plate 254 is also in the key guide groove 11 and integrally extends from the fourth side edge 244. In other words, in this embodiment, the fourth side plate 254 extends from the fourth side edge 244 of the brim 23 (along the vertical direction), rather than the bottom surface 221 of the cap 22. Hence, the fourth side plate 254 is arranged close to the edge of the key 20 as much as possible, and the fourth side plate 254 is arranged closed to the fourth groove wall 114 of the key guide groove 11. For example, the distance between the fourth side plate 254 and the fourth groove wall 114 may be in a range between 0.03 mm and 0.05 mm, so that the fourth side plate 254 and the fourth groove wall 114 are close to each other.

Accordingly, in one or some embodiments of the instant disclosure, when the edge or the corner of the keycap 21 adjacent to the third side plate 253 or the fourth side plate 254 is pressed, the pressing force can be transmitted downward to the third side plate 253 or the fourth side plate 254 directly, so that the length of the force arm can be greatly reduced (almost close to zero). Therefore, the key 20 can be moved downward along the key guide groove 11 properly, thus preventing the key 20 from being deflected and wearing against other components. Therefore, the key 20 can be moved smoothly. Consequently, the operation feeling of the keyboard device 1 can be improved, and the noises generated during the operation of the keyboard device 1 can be also reduced.

As shown in FIG. 4 to FIG. 7, in this embodiment, the slant connection plate 256a is connected between the first side plate 251 and the third side plate 253, and the slant connection plate 256b is connected between the first side plate 251 and the fourth side plate 254, so that the structural strength of the guide member 25 can be enhanced. Moreover, the guide member 25 further comprises at least one reinforcement plate 255a. In this embodiment, the guide member 25 comprises two reinforcement plates 255a, 255b. The reinforcement plate 255a is bent and extends from one side of the third side plate 253, and the reinforcement plate 255a protrudes toward the fourth side plate 254. The reinforcement plate 255b is bent and extends from one side of the fourth side plate 254, and the reinforcement plate 255b protrudes toward the third side plate 253. Therefore, the overall structural strength of the guide member 25 can be enhanced through the configuration of the two reinforcement plates 255a, 255b.

Further, as shown in FIG. 4 to FIG. 7, in this embodiment, the guide member 25 comprises a fifth side plate 259 and a sixth side plate 260 opposite to the fifth side plate 259. In this embodiment, both the fifth side plate 259 and the sixth side plate 260 are standing side plates. The fifth side plate 259 is in the key guide groove 11 and integrally extends from the third side edge 243, and the fifth side plate 259 is arranged close to the third groove wall 113 of the key guide groove 11. Likewise, the sixth side plate 260 is in the key guide groove 11 and integrally extends from the fourth side edge 244, and the sixth side plate 260 is arranged close to the fourth groove wall 114 of the key guide groove 11.

As shown in FIG. 4 to FIG. 7, in this embodiment, the slant connection plate 256c is connected between the second side plate 252 and the fifth side plate 259, and the slant connection plate 256d is connected between the second side plate 252 and the sixth side plate 260, so that the structural strength of the guide member 25 can be enhanced. Moreover, in this embodiment, the guide member 25 comprises two reinforcement plates 255c, 255d. The reinforcement plate 255c is bent and extends from one side of the fifth side plate 259, and the reinforcement plate 255c protrudes toward the sixth side plate 260. The reinforcement plate 255d is bent and extends from one side of the sixth side plate 260, and the reinforcement plate 255d protrudes toward the fifth side plate 259. Therefore, the overall structural strength of the guide member 25 can be enhanced through the configuration of the two reinforcement plates 255c, 255d.

Figure 8:
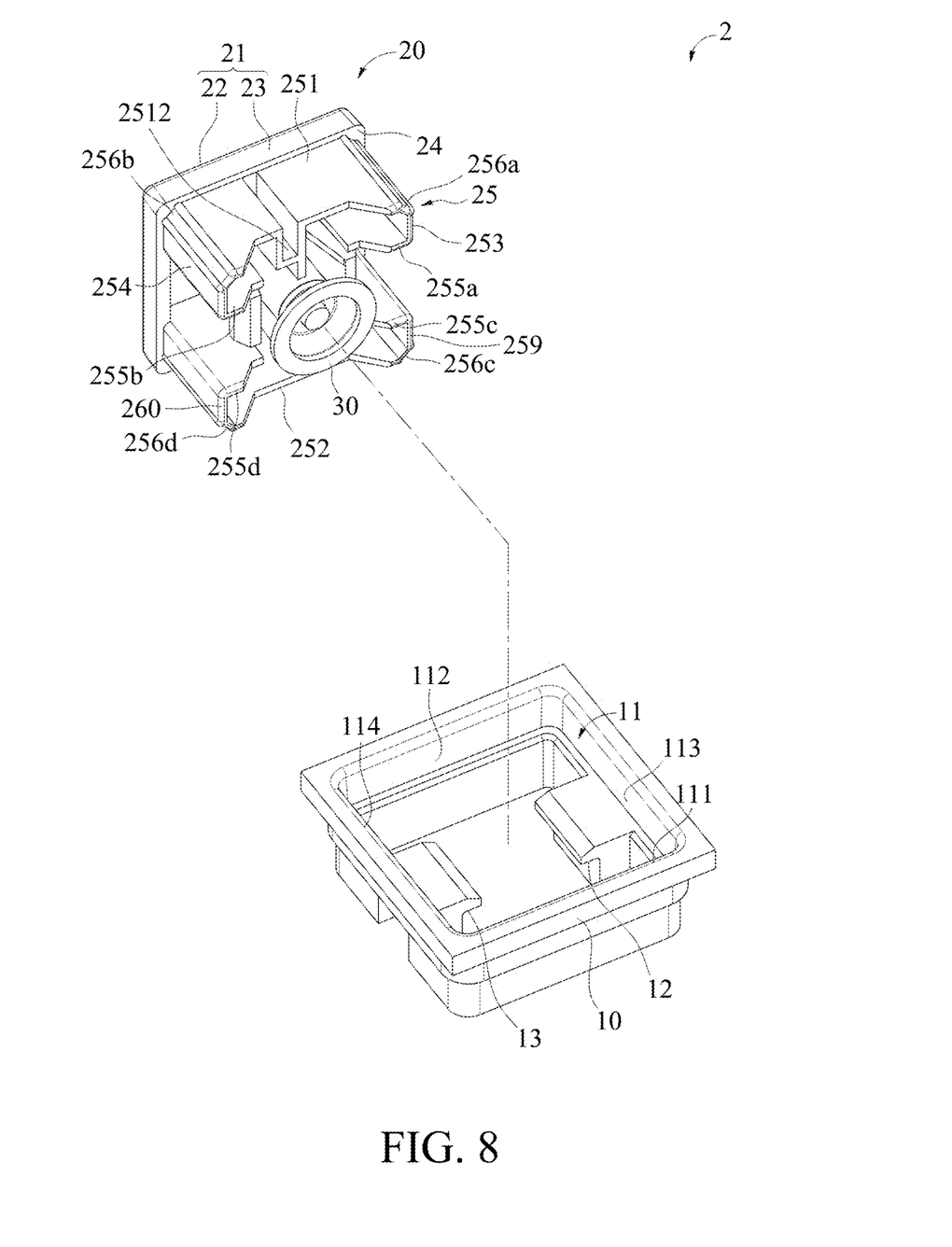
FIG. 8 illustrates a partial exploded view of a keyboard device according to a second embodiment of the instant disclosure.
Figure 9:
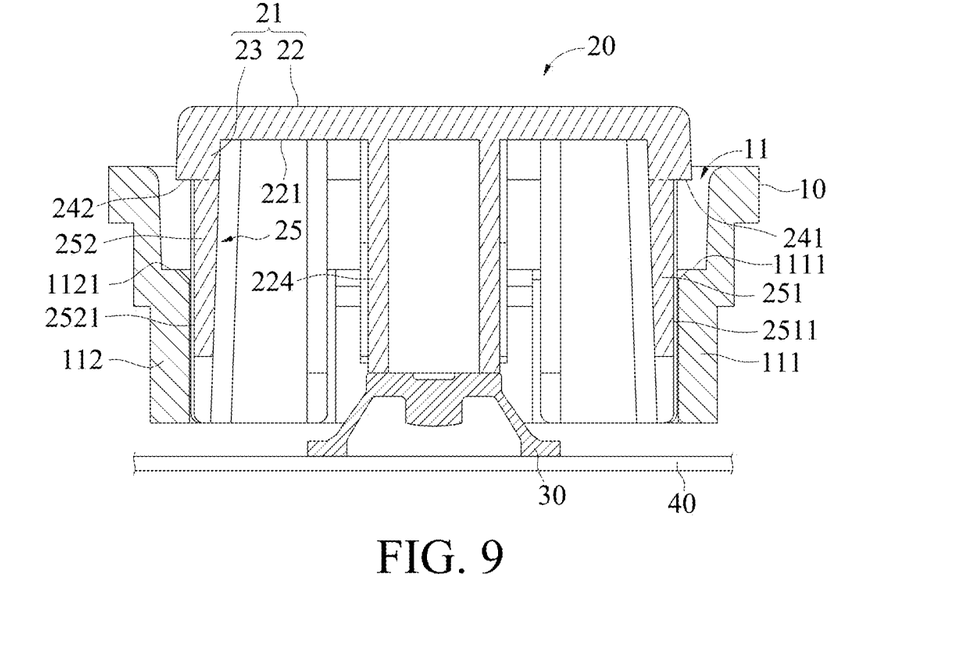
FIG. 9 illustrates a partial cross-sectional view (1) of the keyboard device of the second embodiment.
Figure 10:
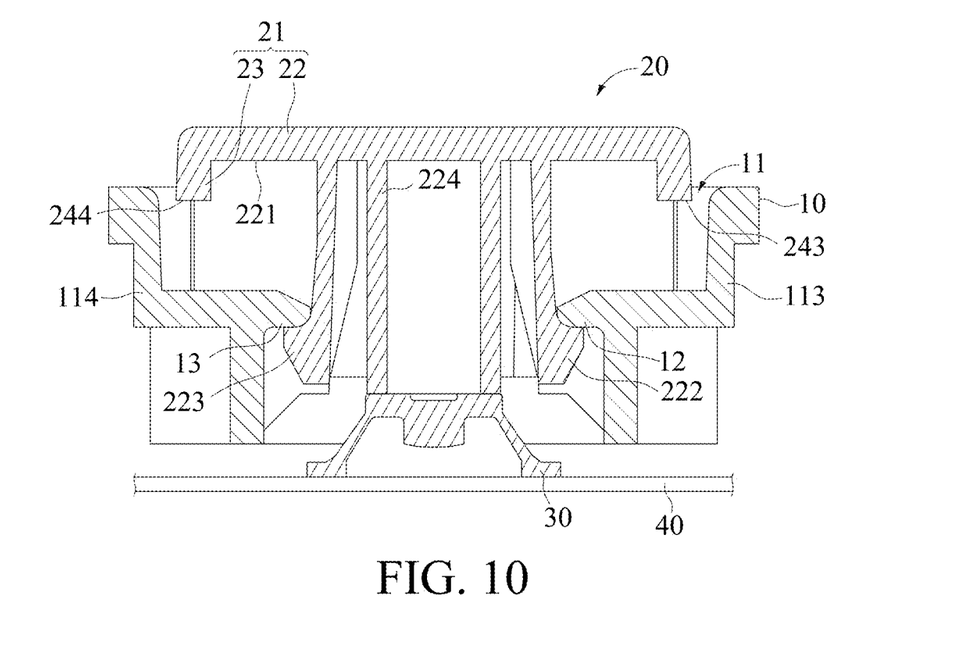
FIG. 10 illustrates a partial cross-sectional view (2) of the keyboard device of the second embodiment.
Figure 11:
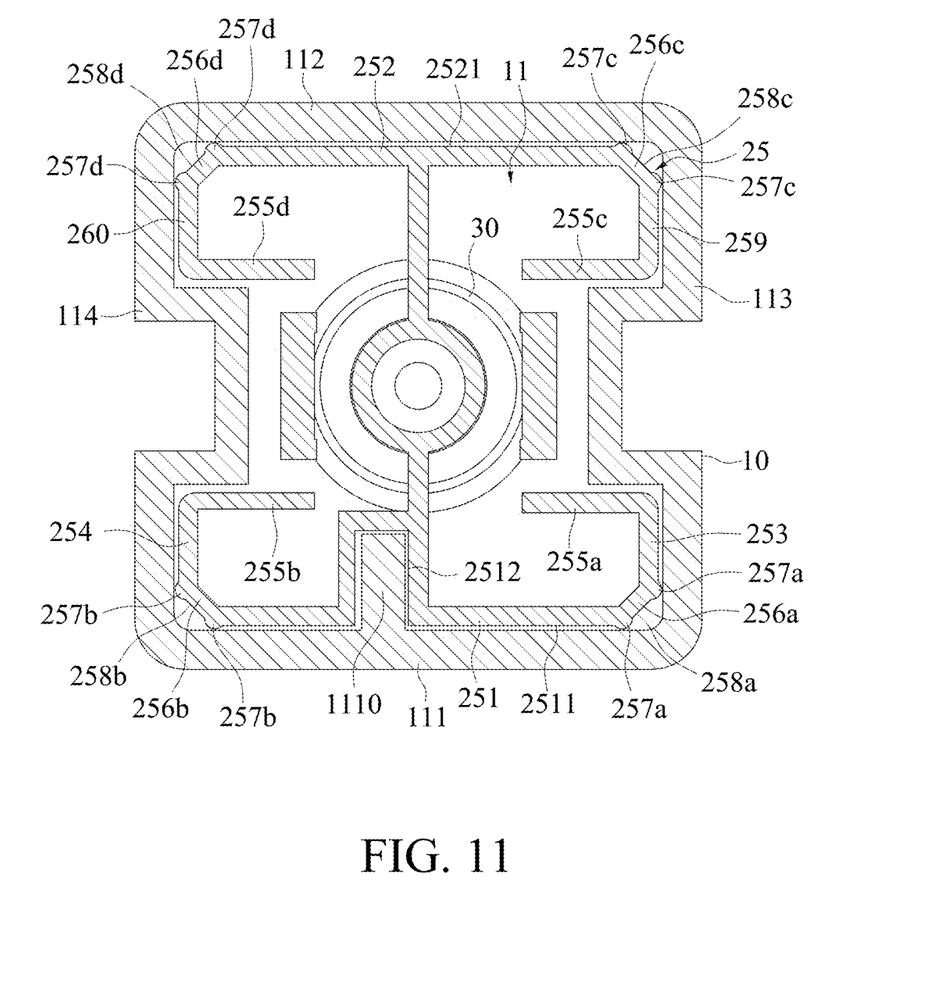
FIG. 11 illustrates a partial cross-sectional view (3) of the keyboard device of the second embodiment.

FIG. 8 illustrates a partial exploded view of a keyboard device according to a second embodiment of the instant disclosure. FIG. 9 illustrates a partial cross-sectional view (1) of the keyboard device of the second embodiment. FIG. 10 illustrates a partial cross-sectional view (2) of the keyboard device of the second embodiment. FIG. 11 illustrates a partial cross-sectional view (3) of the keyboard device of the second embodiment. As shown in FIG. 8 to FIG. 11, the structure of the keyboard device 2 in the second embodiment is approximately the same as the structure of the keyboard device 1 in the first embodiment, except the dimensions of the components of the keyboard device 2. In this embodiment, a standing guide post 1110 protrudes from the first groove wall 111 of the guide member 25 of the key 20, a standing guide groove 2512 is on the first side plate 251 of the guide member 25, and the standing guide post 1110 is received in the standing guide groove 2512. Therefore, during the process of assembling the key 20 in the key guide groove 11, the assembling operator can realize the correct assembling direction through the standing guide post 1110 and the standing guide groove 2512, so that the key 20 can be assembled in the key guide groove 11 effectively.

Moreover, as shown in FIG. 9, another difference between the keyboard device 2 of this embodiment and the keyboard device 1 of the first embodiment is that, in this embodiment, the thickness of the first side plate 251 is less than the thickness of the first side edge 241, and the thickness of the second side plate 252 is also than the thickness of the second side edge 242. Therefore, the first side edge 241 protrudes from the first side surface 2511 of the first side plate 251, and the second side edge 242 protrudes from the second side surface 2521 of the second side plate 252. Furthermore, a first guide groove 1111 is on the first groove wall 111 of the key guide groove 11, a second guide groove 1121 is on the second groove wall 112 of the key guide groove 11, and the first side edge 241 and the second side edge 242 are respectively received in the first guide groove 1111 and the second guide groove 1121, so that the first side plate 241 and the second side plate 242 can be arranged close to the first groove wall 111 and the second groove wall 112 as much as possible.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A keyboard device comprising:
    a frame comprising a plurality of key guide grooves, wherein the key guide grooves are spacedly arranged from each other, and each of the key guide grooves comprises a first groove wall and a second groove wall opposite to the first groove wall; and
    a plurality of keys slidably assembled in the key guide grooves, wherein each of the keys comprises a key cap and a guide member, and the key cap comprises a cap and a brim; the cap has a bottom surface, the brim is connected to a peripheral portion of the bottom surface and extends toward a bottom portion of the frame, the brim has an annular bottom portion, and the annular bottom portion has a first side edge and a second side edge opposite to the first side edge; the guide member comprises a first side plate and a second side plate opposite to the first side plate, the first side plate integrally extends from the first side edge, the second side plate integrally extends from the second side edge; the first side plate of each of the keys is in a corresponding one of the key guide grooves and close to the first groove wall of the corresponding one of the key guide grooves;
    the second side plate of each of the keys is in the corresponding one of the key guide grooves and close to the second groove wall of the corresponding one of the key guide grooves;
    wherein the first side plate has a first vertical length, the first groove wall has a second vertical length, and the first vertical length is greater than half of the second vertical length.

2. The keyboard device according to claim 1, wherein the first side plate has a first side surface facing the first groove wall, and the first side surface is an inclined surface.

3. The keyboard device according to claim 1, wherein the frame comprises a third groove wall and a fourth groove wall opposite to the third groove wall; the guide member comprises a third side plate and a fourth side plate opposite to the third side plate, and the annular bottom portion comprises a third side edge and a fourth side edge opposite to the third side edge, the third side plate integrally extends from the third side edge, the fourth side plate integrally extends from the fourth side edge; the third side plate of each of the keys is in the corresponding one of the key guide grooves and close to the third groove wall of the corresponding one of the key guide grooves; the fourth side plate of each of the keys is in the corresponding one of the key guide grooves and close to the fourth groove wall of the corresponding one of the key guide grooves.

4. The keyboard device according to claim 3, wherein the guide member comprises a reinforcement plate, the reinforcement plate is bent and extends from one side of the third side plate, and the reinforcement plate protrudes toward the fourth side plate.

5. The keyboard device according to claim 3, wherein the guide member comprises a slant connection plate connected between the first side plate and the third side plate.

6. The keyboard device according to claim 5, wherein two bar-shaped ribs are on the slant connection plate, and the two bar-shaped ribs are respectively in contact with the first groove wall and the third groove wall.

7. The keyboard device according to claim 6, wherein an oil supplying groove is formed between the two bar-shaped ribs.

8. The keyboard device according to claim 1, further comprising a plurality of elastic members, wherein a trigger member is on the bottom surface of the cap of each of the keys, and each of the elastic members abuts against the trigger member of a corresponding one of the keys.

9. A keyboard device comprising:
    a frame comprising a plurality of key guide grooves, wherein the key guide grooves are spacedly arranged from each other, and each of the key guide grooves comprises a first groove wall and a second groove wall opposite to the first groove wall; and
    a plurality of keys slidably assembled in the key guide grooves, wherein each of the keys comprises a key cap and a guide member, and the key cap comprises a cap and a brim; the cap has a bottom surface, the brim is connected to a peripheral portion of the bottom surface and extends toward a bottom portion of the frame, the brim has an annular bottom portion, and the annular bottom portion has a first side edge and a second side edge opposite to the first side edge; the guide member comprises a first side plate and a second side plate opposite to the first side plate, the first side plate integrally extends from the first side edge, the second side plate integrally extends from the second side edge; the first side plate of each of the keys is in a corresponding one of the key guide grooves and close to the first groove wall of the corresponding one of the key guide grooves;
    the second side plate of each of the keys is in the corresponding one of the key guide grooves and close to the second groove wall of the corresponding one of the key guide grooves;
    wherein a thickness of the first side plate is less than or equal to a thickness of the first side edge.

10. A keyboard device comprising:
    a frame comprising a plurality of key guide grooves, wherein the key guide grooves are spacedly arranged from each other, and each of the key guide grooves comprises a first groove wall and a second groove wall opposite to the first groove wall; and
    a plurality of keys slidably assembled in the key guide grooves, wherein each of the keys comprises a key cap and a guide member, and the key cap comprises a cap and a brim; the cap has a bottom surface, the brim is connected to a peripheral portion of the bottom surface and extends toward a bottom portion of the frame, the brim has an annular bottom portion, and the annular bottom portion has a first side edge and a second side edge opposite to the first side edge; the guide member comprises a first side plate and a second side plate opposite to the first side plate, the first side plate integrally extends from the first side edge, the second side plate integrally extends from the second side edge; the first side plate of each of the keys is in a corresponding one of the key guide grooves and close to the first groove wall of the corresponding one of the key guide grooves; the second side plate of each of the keys is in the corresponding one of the key guide grooves and close to the second groove wall of the corresponding one of the key guide grooves;

wherein a standing guide post protrudes from the first groove wall, a standing guide groove is on the first side plate of the guide member, and the standing guide post is received in the standing guide groove.

11. A keyboard device comprising:
a frame comprising a plurality of key guide grooves, wherein the key guide grooves are spacedly arranged from each other, and each of the key guide grooves comprises a first groove wall and a second groove wall opposite to the first groove wall; and
a plurality of keys slidably assembled in the key guide grooves, wherein each of the keys comprises a key cap and a guide member, and the key cap comprises a cap and a brim; the cap has a bottom surface, the brim is connected to a peripheral portion of the bottom surface and extends toward a bottom portion of the frame, the brim has an annular bottom portion, and the annular bottom portion has a first side edge and a second side edge opposite to the first side edge; the guide member comprises a first side plate and a second side plate opposite to the first side plate, the first side plate integrally extends from the first side edge, the second side plate integrally extends from the second side edge; the first side plate of each of the keys is in a corresponding one of the key guide grooves and close to the first groove wall of the corresponding one of the key guide grooves;

the second side plate of each of the keys is in the corresponding one of the key guide grooves and close to the second groove wall of the corresponding one of the key guide grooves;

wherein a first limiting member and a second limiting member are in the key guide groove, a first barb and a second bard are on a bottom surface of the cap, and the first bard and the second bard are respectively hooked with the first limiting member and the second limiting member.

* * * * *